United States Patent [19]
Harrison et al.

[11] Patent Number: 5,851,965
[45] Date of Patent: Dec. 22, 1998

[54] DISPERSANT COMPOSITIONS HAVING POLYALKYLENE SUCCINIMIDES

[75] Inventors: James J. Harrison, Novato; William R. Ruhe, Jr., Benicia, both of Calif.

[73] Assignee: Chevron Chemical Company, San Ramon, Calif.

[21] Appl. No.: 902,427

[22] Filed: Jul. 29, 1997

Related U.S. Application Data

[62] Division of Ser. No. 566,231, Dec. 1, 1995, abandoned.

[51] Int. Cl.$^6$ ................................................ C10M 133/44
[52] U.S. Cl. ............................................................ 508/291
[58] Field of Search ...................................... 508/192, 291

[56] References Cited

U.S. PATENT DOCUMENTS

| | | | |
|---|---|---|---|
| 3,172,892 | 3/1965 | Le Suer et al. | 260/326.5 |
| 3,219,666 | 11/1965 | Norman et al. | 260/268 |
| 3,361,673 | 1/1968 | Stuart et al. | 252/51.5 |
| 3,381,022 | 4/1968 | Le Suer | 260/404.8 |
| 3,455,827 | 7/1969 | Mehmedbasich | 252/32.7 |
| 3,912,764 | 10/1975 | Palmer, Jr. | 260/346.8 |
| 4,234,435 | 11/1980 | Meinhardt et al. | 252/51.5 A |
| 4,612,132 | 9/1986 | Wollenberg et al. | 252/51.5 A |
| 4,747,965 | 5/1988 | Wollenberg et al. | 252/51.5 A |
| 5,112,507 | 5/1992 | Harrison | 252/51.5 A |
| 5,241,003 | 8/1993 | Degonia et al. | 525/123 |
| 5,266,186 | 11/1993 | Kaplan | 208/48 AA |
| 5,286,799 | 2/1994 | Harrison et al. | 525/285 |
| 5,319,030 | 6/1994 | Harrison et al. | 525/285 |
| 5,334,321 | 8/1994 | Harrison et al. | 252/51.5 A |
| 5,356,552 | 10/1994 | Harrison et al. | 252/51.5 A |
| 5,670,462 | 9/1997 | Barr et al. | 508/291 |

FOREIGN PATENT DOCUMENTS

| | | | |
|---|---|---|---|
| 0 072 645 | 2/1983 | European Pat. Off. | C10M 1/32 |
| 0 146 162 | 6/1985 | European Pat. Off. | C10M 145/16 |
| 0 657 475 | 6/1995 | European Pat. Off. | C08F 8/46 |
| 0 682 102 | 11/1995 | European Pat. Off. | C10M 159/12 |
| 4 330 971 | 3/1995 | Germany | C08F 255/00 |
| 1 488 486 | 10/1977 | United Kingdom | C08F 8/32 |

OTHER PUBLICATIONS

E.S. Forbes and E.L. Neustadter, "The Mechanism of Action of Polyisobutenyl Succinimide Lubricating Oil Additives," (Tribology, vol. 5, No. 2, pp. 72–77; Apr. 1972).

S.T. Roby, R. E. Kornbrekke and J.A. Supp, "Deposit Formulation in Gasoline Engines, Part 2, Dispersant Effects on Sequence VE Deposits." (Journal of the Society of Tribologists and Lubrication Engineers, vol. 50, 12, 989–995; Dec. 1994).

Communication from European Patent Office.

*Primary Examiner*—Jacqueline V. Howard
*Attorney, Agent, or Firm*—Ernest A. Schaal

[57] ABSTRACT

A succinimide composition is prepared by reacting a mixture of an alkenyl or alkylsuccinic acid derivative, an unsaturated acidic reagent copolymer, and a polyamine under reactive conditions. The alkenyl or alkyl substituent of the alkenyl or alkylsuccinic acid derivative has a Mn of from 1000 to 5000. The unsaturated acidic reagent copolymer is a copolymer of an unsaturated acidic reagent and an alkylene group. That alkylene group can be an α-olefin having 8 to 42 carbon atoms, a polyalkylene having from 8 to 28 carbon atoms, ethylene, styrene, 1,3-butadiene, vinyl alkyl ether having at least 3 carbon atoms, or vinyl alkanoate having at least 4 carbon atoms. The polyamine has at least three nitrogen atoms and 4 to 20 carbon atoms. The mixture contains from 0.5 to 10 equivalents of the alkenyl or alkylsuccinic acid derivative per equivalent of unsaturated acidic reagent copolymer and from 0.4 to 1.0 moles of polyamine per equivalent of alkenyl or alkylsuccinic acid derivative plus unsaturated acidic reagent copolymer.

6 Claims, No Drawings

DISPERSANT COMPOSITIONS HAVING POLYALKYLENE SUCCINIMIDES

This application is a division of application Ser. No. 08/566,231, filed Dec. 1, 1995, now abn which is incorporated by reference herein in their entirety.

The present invention relates to novel compositions comprising polyalkylene succinimides and post-treated derivatives of polyalkylene succinimides. In a further aspect, the invention relates to methods of preparing these compositions and their uses as dispersants in lubricating oils and deposit inhibitors in hydrocarbon fuels. In another-aspect, the invention relates to concentrates, lubricating oil compositions, and hydrocarbon fuel compositions containing such novel compositions.

BACKGROUND OF THE INVENTION

Lubricating oil compositions for internal combustion engines generally contain a variety of additives to reduce or control deposits, wear, corrosion, etc. Similarly, liquid hydrocarbon fuels for internal composition engines, at a minimum, contain additives which control or reduce the formation of deposits. The present invention is concerned with compositions useful as dispersants or deposit inhibitors.

In lubricating oils, dispersants function to control sludge, carbon, and varnish produced primarily by the incomplete oxidation of the fuel, or impurities in the fuel, or impurities in the base oil used in the lubricating oil composition. Dispersants also control viscosity increase due to the presence of soot in diesel engine lubricating oils.

Deposit inhibitors in fuel control or reduce engine deposits also caused by incomplete combustion of the fuel. Such deposits can form on the carburetor parts, throttle bodies, fuel injectors, intake parts, and valves. Those deposits can present significant problems, including poor acceleration and stalling, and increased fuel consumption and exhaust pollutants.

One of the most effective class of lubricating oil dispersants and fuel deposit inhibitors are polyalkylene succinimides. In some cases, the succinimides have also been found to provide fluid-modifying properties, or a so-called viscosity index credit, in lubricating oil compositions. That results in a reduction in the amount of viscosity index improver which would be otherwise have to be used. A drawback of succinimide dispersants is that they have generally been found to reduce the life of fluorocarbon elastomers. In general, for a given succinimide dispersant, a higher nitrogen content gives better dispersancy but poorer fluorocarbon elastomer compatibility.

Therefore, as well as improving the dispersancy and VI credit properties of polyalkylene succinimides, it would be desirable to improve the fluorocarbon elastomer compatibility of such dispersants. It would further be desirable to improve the stability of polyalkylene succinimides, particularly hydrolytic stability and shear stress stability. It would also be desirable to improve soot dispersancy, especially where the lubricating oil is intended for use in diesel engine crankcases.

Polyalkylene succinimides are generally prepared by the reaction of the corresponding polyalkylene succinic anhydride with a polyalkyl polyamine. Polyalkylene succinic anhydrides are generally prepared by a number of well-known processes. For example, there is a well-known thermal process (see, e.g., U.S. Pat. No. 3,361,673), an equally well-known chlorination process (see, e.g., U.S. Pat. No. 3,172,892), a combination of the thermal and chlorination processes (see, e.g., U.S. Pat. No. 3,912,764), and free radical processes (see, e.g., U.S. Pat. Nos. 5,286,799 and 5,319,030). Such compositions include one-to-one monomeric adducts (see, e.g., U.S. Pat. Nos. 3,219,666 and 3,381,022), as well as "multiply adducted" products, adducts having alkenyl-derived substituents adducted with at least 1.3 succinic groups per alkenyl-derived substituent (see, e.g., U.S. Pat. No. 4,234,435).

U.S. Pat. Nos. 3,361,673 and 3,018,250 describe the reaction of an alkenyl- or alkyl-substituted succinic anhydride with a polyamine to form alkenyl or alkyl succinimides lubricating oil dispersants and/or detergent additives.

U.S. Pat. No. 4,612,132 teaches that alkenyl or alkyl succinimides may be modified by reaction with a cyclic or linear carbonate or chloroformate such that one or more of the nitrogens of the polyamine moiety is substituted with a hydrocarbyl oxycarbonyl, a hydroxyhydrocarbyl oxycarbonyl, or a hydroxy poly(oxyalkylene) oxycarbonyl. These modified succinimides are described as exhibiting improved dispersancy and/or detergency in lubricating oils.

U.S. Pat. No. 4,747,965 discloses modified succinimides similar to those disclosed in U.S. Pat. No. 4,612,132, except that the modified succinimides is described as being derived from succinimides having an average of greater than 1.0 succinic groups per long chain alkenyl substituent.

The effect of the alkenyl-derived substituent's molecular weight on the performance of succinimides as lubricating oil additives is described in "The Mechanism of Action of Polyisobutenyl Succinimide Lubricating Oil Additives," by E. S. Forbes and E. L. Neustadter (TRIBOLOGY, Vol. 5, No. 2, pp. 72–77 (April, 1972)). This article discusses, in part, the effect of polyisobutenyl Mn on the detergency properties of a polyisobutenyl succinimide. However, as shown in FIG. 1 on page 76 of their article, the results of the tests Forbes and Neustadter conducted indicate that succinimides having a 1300 Mn polyisobutenyl substituent are more effective as detergents than those having a polyisobutenyl substituent with a Mn of 2000 or greater. In showing the effect of polyisobutenyl molecular weight on succinimide detergency, this article teaches that maximum detergency performance is obtained when the polyisobutenyl group has a Mn of about 1300.

A recent article by S. T. Roby, R. E. Kornbrekke, and J. A. Supp "Deposit Formulation in Gasoline Engines, Part 2, Dispersant Effects on Sequence VE Deposits" JOURNAL OF THE SOCIETY OF TRIBOLOGISTS AND LUBRICATION ENGINEERS, Vol. 50, 12, 989–995 (December 1994) teaches that the length of the dispersant alkyl side chain influences deposit control performance, and that, at the same nitrogen level, the low molecular weight (side chain 1000 daltons) dispersants that were tested were poorer than the tested high molecular weight (side chain 2000 daltons) succinimide dispersants. This teaching is also consistent with our prior observation comparing 950 Mn side chain succinimides with 2200 Mn side chain succinimides.

U.S. Pat. No. 4,234,435 teaches a preferred polyalkene-derived substituent group with a Mn in the range of 1500–3200. For polybutenes, an especially preferred Mn range is 1700–2400. This patent also teaches that the succinimides must have a succinic ratio of at least 1.3. That is, there should be at least 1.3 succinic groups per equivalent weight of polyalkene-derived substituent group. Most preferably, the succinic ratio should be from 1.5 to 2.5. This patent further teaches that its dispersants also provide an improvement in viscosity index. That is, these additives impart fluidity modifying properties to lubricant compositions containing them. This is considered desirable for use in multigrade lubricating oils but undesirable for single-grade lubricating oils.

Polyamino alkenyl or alkyl succinimides and other additives useful as dispersants and/or detergents, such as Mannich bases, contain basic nitrogen. While basicity is an important property to have in the dispersant/detergent additive, it is believed that the initial attack on fluorocarbon elastomer seals used in some engines involves attack by the basic nitrogen. This attack leads to the loss of fluoride ions, and eventually results in cracks in the seals and loss of other desirable physical properties in the elastomer.

A variety of post-treatments for improving various properties of alkenyl succinimides are known to the art, a number of which are described in U.S. Pat. No. 5,241,003.

Example 2 of U.S. Pat. No. 5,266,186 discloses the preparation of dispersants by reacting certain polyisobutenyl-succinic anhydride adducts (see footnote 2 of Table 2) with ethylenediamine, followed by reaction with a maleic anhydride/α-olefin copolymer. The patent teaches that, by functioning as an iron sulfide dispersant, the product is useful to inhibit sludge deposits in refinery processing equipment caused by the heat treatment of hydrocarbon feed stocks.

U.S. Pat. No. 5,112,507 discloses a polymeric ladder type polymeric succinimide dispersant in which each side of the ladder is a long chain alkyl or alkenyl, generally having at least about 30 carbon atoms, preferably at least about 50 carbon atoms. The dispersant is described as having improved hydrolytic stability and shear stress stability, produced by the reaction of certain maleic anhydride-olefin copolymers with certain polyamines. The patent further teaches that the polymer may be post-treated with a variety of post-treatments, and describes procedures for post-treating the polymer with cyclic carbonates, linear mono- or polycarbonates; boron compounds (e.g., boric acid), and fluorophosphoric acid and ammonia salts thereof.

U.S. Pat. Nos. 5,334,321 and 5,356,552 disclose certain cyclic carbonate post-treated alkenyl or alkylsuccinimides having improved fluorocarbon elastomer compatibility, which are preferably prepared by the reaction of the corresponding substituted succinic anhydride with a polyamine having at least four nitrogen atoms per mole.

SUMMARY OF THE INVENTION

The present invention provides novel polymers comprising polyalkylene succinimides and post-treated derivatives thereof. These polymers, and in particular the post-treated derivatives, have excellent dispersant properties, improved hydrolytic and shear stress stability, and improved fluorocarbon elastomer compatibility. In a preferred embodiment the polymers are essentially chlorine-free.

The polyalkylene succinimides of the present invention can be prepared by the reaction of alkyl or alkenyl succinic acid derivatives with certain copolymers of an unsaturated acidic reagent (for example copolymers of unsaturated acidic reagents and α-olefins) and a polyamine having at least three nitrogens per molecule. The α-olefin moiety of the copolymer may also be substituted with various substituents, so long as the substituent does not interfere with the reaction or adversely affect performance of the product. Because of competing and sequential reactions, the reaction product will be a mixture of compounds, which function as dispersants. Thus, by varying the mole ratio of reactants, variations in the products, and correspondingly variations in the properties of product, can be obtained. The reaction product will be a mixture because all of the reactants are generally furnished commercially as mixtures.

It is believed that the improvement in properties is primarily due to the production of a new polyalkylene succinimide that can be represented by the following formula:

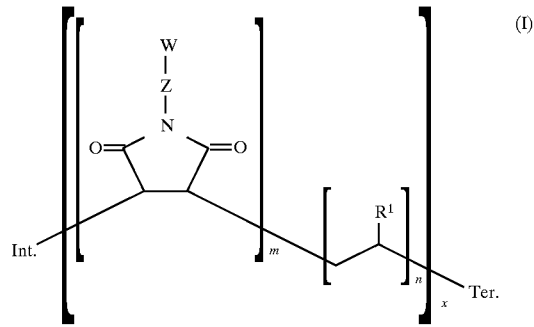

wherein:

W is a nitrogen-containing group selected from the group consisting

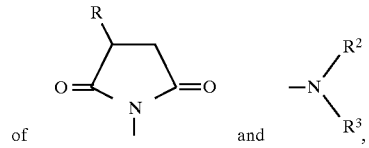

R is a polyalkyl or polyalkylene having a number average molecular weight of at least 1000, preferably from 1800 to 3000, $R^1$ is hydrogen, alkyl having from 6 to 40 carbon atoms, cycloalkyl, aryl, alkylaryl, vinyl, alkoxy, or alkylcarboxy, preferably an alkyl having from 12 to 18 carbon atoms;

Z is a polyalkylene polyamine linking radical;

m is a whole integer of from 1 to 3 n is a whole integer of from 1 to 3;

x is a whole integer of from 1 to 100, preferably from 2 to 20;

Int. is an initiating radical;

Ter. is a terminating group; and wherein $R^2$ and $R^3$ are independently hydrogen, alkyl, phenyl, or taken together are alkylene to give a ring group.

The (Int.) and (Ter.) substituent are carried over into the present composition from the maleic anhydride reactant and are present in the copolymer reactants as a result of the free radical initiator used to prepare the copolymer. Typical (Int.) and (Ter.) group include

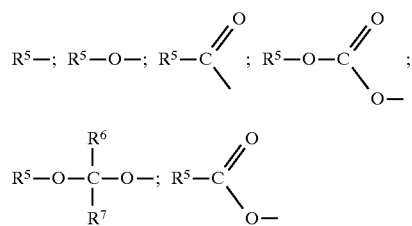

wherein $R^5$ is hydrogen, alkyl, aryl, alkaryl, cycloalkyl, alkoxy, cycloalkoxy, acyl, alkenyl, cycloalkenyl, alkynyl; or alkyl, aryl or alkaryl optionally substituted with 1 to 4 substituents independently selected from nitrile, keto, halogen, nitro, alkyl, aryl, and the like; and R⁶ and R⁷ are independently hydrogen, alkyl, aryl, alkaryl, and the like.

Typically the (Int.) group and (Ter.) group will be the same but may also be different because of secondary or competing reactions in the initial copolymerization or the subsequent reaction used to prepare the composition of the present invention; including, in some reaction with organic solvents such as toluene, resulting in a benzyl radical initiator or terminating group.

The corresponding post-treated derivative can be obtained by treating the reaction product with the desired post-treatment. For example, the reaction product is preferably treated with a cyclic carbonate, preferably ethylene carbonate, preferably by the procedure described in U.S. Pat. Nos. 4,612,132 and 5,334,321 hereby incorporated by reference.

The present invention further provides lubricating oil compositions comprising a major amount of a base oil of lubricating viscosity and a minor amount of the compounds of the invention ("active ingredients"). The active ingredients can be applied at effective amounts, which are highly effective to control engine sludge and varnish and yet be compatible with fluorocarbon elastomer engine seals. The invention also provides a concentrate comprising about 20 to 60 wt. % of the compounds or compound mixtures and about 40 to 80 wt. % of a compatible liquid diluent designed to be added directly to a base oil. Both the lubricating oil composition and concentrate may also contain other additives designed to improve the properties of the base oil, including other detergent-dispersants.

The present invention further provides a fuel composition comprising a major amount of hydrocarbons boiling in the gasoline or diesel range and from 10 to 10,000 parts per million parts of the hydrocarbon of a compound or mixture of compounds of the present invention.

The composition of the present invention can be prepared reacting a mixture under reactive conditions, wherein the mixture comprises:

(a) an alkenyl or alkylsuccinic acid derivative, wherein the alkenyl or alkyl substituent has a Mn of from 1000 to 5000;

(b) an unsaturated acidic reagent copolymer of
  (1) an unsaturated acidic reagent and
  (2) an alkylene group selected from the group consisting of an α-olefin having 8 to 42 carbon atoms, a polyalkylene having from 8 to 28 carbon atoms, ethylene, styrene, 1,3-butadiene, vinyl alkyl ether having at least 3 carbon atoms, and vinyl alkanoate having at least 4 carbon atoms; and (c) a polyamine having at least three nitrogen atoms and 4 to 20 carbon atoms.

The mixture contains about from 0.5 to 10 equivalents of the alkenyl or alkylsuccinic acid derivative per equivalent of the unsaturated acidic reagent copolymer and about from 0.4 to 1.0 moles of the polyamine per equivalent of alkenyl or alkylsuccinic acid derivative plus unsaturated acidic reagent copolymer. Preferably, the alkenyl or alkyl substituent of the alkenyl or alkylsuccinic acid derivative has a Mn of 1800 to 3000, the acid derivative is an anhydride, and the unsaturated acidic reagent copolymer is a copolymer of maleic anhydride and an α-olefin having 12 to 18 carbon atoms, and the polyamine has at least six nitrogen atoms per mole.

Additional aspects of the invention will be apparent from the following detailed description.

DETAILED DESCRIPTION OF THE INVENTION

In its broadest aspect, the present invention involves a polymer having the general formula:

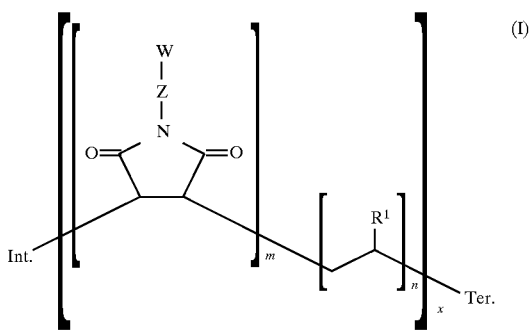

wherein:

W is a nitrogen-containing group selected from the group consisting

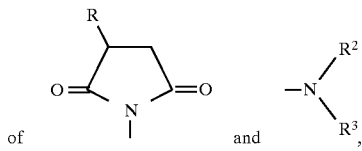

R is a polyalkyl or polyalkylene having a number average molecular weight of at least 1000, R¹ is hydrogen, alkyl having from 6 to 40 carbon atoms, cycloalkyl, aryl, alkylaryl, vinyl, alkoxy, or alkylcarboxy;

Z is a polyalkylene polyamine linking radical;

m is a whole integer of from 1 to 3 n is a whole integer of from 1 to 3;

x is a whole integer of from 1 to 100;

Int. is an initiating radical;

Ter. is a terminating group; and wherein R² and R³ are independently hydrogen, alkyl, phenyl, or taken together are alkylene to give a ring group.

In simplified terms, the compound of formula (I), shown above, can be considered a polyalkylene succinimide produced by the reaction of a copolymer (the unsaturated acidic reagent copolymer) with a monomer (the alkene or alkyl succinic acid derivative) in which the monomer is linked to the polymer units by a polyamine linking group. Because the polyalkylene succinimide mixture contains about from 0.5 to 10 equivalents of alkenyl or alkylsuccinic acid derivative per equivalent of unsaturated acidic reagent copolymer, and about from 0.4 to 1.0 equivalents of polyamine per equivalent of alklenyl or alkylsuccinic acid derivative plus unsaturated acidic reagent copolymer, other structures, such as (II) and (III), shown below, can also be present, depending on the ratios of alkenyl or alkylsuccinic acid derivative, unsaturated acidic reagent copolymer, and polyamine.

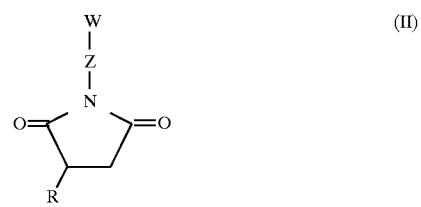

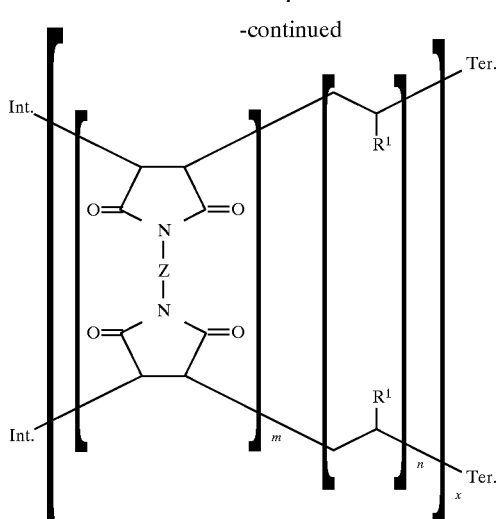

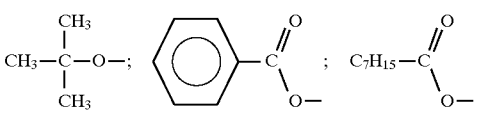

wherein W, R, $R^1$, $R^2$, and $R^3$, Z, m, n, x, Int., Ter are the same as described above.

For example, if the ratio of alkenyl or alkyl succinic acid derivative per equivalent of unsaturated acidic reagent copolymer is 1.0:1, and the ratio of polyamine to the sum of the alkenyl or alkylsuccinic acid derivative plus unsaturated acidic reagent copolymer is 0.5:1, then structure (I) would predominate. However, if the ratio of alkenyl or alkylsuccinic acid derivative per equivalent of unsaturated acidic reagent copolymer is greater than 1:1, and the ratio of polyamine per equivalent of alkenyl or alkylsuccinic acid derivative plus unsaturated acidic reagent copolymer is 0.5:1, then structures (II) and (I) will predominate, where W is

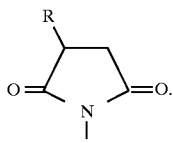

In addition, if the ratio of alkenyl or alkylsuccinic acid derivative per equivalent of unsaturated acidic reagent copolymer is greater than 1:1 and the ratio of polyamine to alkenyl or alkylsuccinic acid derivative plus unsaturated acidic reagent copolymer is about 1.0:1, then structures (I) and (II) would predominate, where W is $NH_2$.

In addition to the predominant polymer of formula (I), (II), or (III), the reaction will typically contain more complex reaction products and polymers because of competing and sequential reactions, and because the alkenyl or alkylsuccinic acid derivative might contain more than one succinic anhydride moiety per long chain alkyl or alkenyl group or contain unsaturated acidic reagent oligomers.

Referring to formulas (I), (II), and (III), the preferred compounds or compound mixtures are those wherein R is a polyalkyl or polyalkylene having an Mn of about from 1800 to 3000; $R^1$ is an alkyl group having about from 10 to 24 carbon atoms, more preferably about from 12 to 18 carbon atoms; Z is a polyamino radical having about from 3 to 7, more preferably, about 4 to 5 nitrogen atoms and 8 to 20 carbon atoms; and x is a whole integer of from 2 through 20.

The initiating group and terminating group will be a function of the initiator used to initiate the free radical reaction used to prepare the copolymer and may vary with the particular copolymer and secondary reactions. Discounting secondary reactions, the preferred Int. and Ter. groups are where $R^1$ is a preferred alkyl group are

Definitions

As used herein the following terms have the following meanings, unless expressly stated to the contrary.

The term "succinimide" is understood in the art to include many of the amide, imide, etc. species which are also formed by the reaction of a succinic anhydride with an amine. The predominant product, however, is succinimide and this term has been generally accepted as meaning the product of a reaction of an alkenyl- or alkyl-substituted succinic acid or anhydride with a polyamine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference.

The term "Total Base Number" or "TBN" refers to the amount of base equivalent to milligrams of KOH in 1 gram of sample. Thus, higher TBN numbers reflect more alkaline products and therefore a greater alkalinity reserve. The TBN of a sample can be determined by ASTM Test No. D2896 or any other equivalent procedure.

The term "SAP" refers to Saponification Number and can be determined by the procedure described in ASTM D94 or any other equivalent procedure.

The term "TAN" refers to Total Acid Number and can be determined by the procedure described in ASTM D 664 or any other equivalent procedure.

The "succinic ratio" or "succination ratio" refers to the ratio calculated in accordance with the procedure and mathematical equation set forth in columns 5 and 6 of U.S. Pat. No. 5,334,321, hereby incorporated by reference. The calculation is asserted to represent the average number of succinic groups in an alkenyl or alkylsuccinic anhydride per alkenyl or alkyl chain.

The term "PIBSA" means polyisobutenyl succinic anhydride.

The term "hydrocarbon soluble compatible salt" refers to a salt which is soluble in an oil of lubricating viscosity or a hydrocarbon fuel suitable for use in spark-ignition or diesel engines and which is compatible with such composition.

The term "alkenyl or alkylsuccinic acid derivative" refers to a structure having the formula

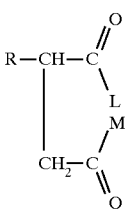

wherein L and M are independently selected from the group consisting of —OH, —Cl, —O—, lower alkyl or taken together are —O— to form an alkenyl or alkylsuccinic anhydride group.

The term "unsaturated acidic reagent" refers to maleic or fumaric reactants of the general formula:

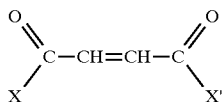

wherein X and X' are the same or different, provided that at least one of X and X' is a group that is capable of reacting to esterify alcohols, form amides, or amine salts with ammonia or amines, form metal salts with reactive metals or basically reacting metal compounds and otherwise function as acylating agents. Typically, X and/or X' is —OH, —O-hydrocarbyl, —OM$^+$ where M$^+$ represents one equivalent of a metal, ammonium or amine cation, —NH$_2$, —Cl, —Br, and taken together X and X' can be —O— so as to form an anhydride. Preferably, X and X' are such that both carboxylic functions can enter into acylation reactions. Maleic anhydride is a preferred unsaturated acidic reactant. Other suitable unsaturated acidic reactants include electron-deficient olefins such as monophenyl maleic anhydride; monomethyl, dimethyl, monochloro, monobromo, monofluoro, dichloro and difluoro maleic anhydride, N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile, and fumaronitrile.

Synthesis

The compounds of the present invention can be prepared by contacting the desired alkyl or alkenyl succinic acid derivative with an unsaturated acidic reagent copolymer and polyamine under reactive conditions:

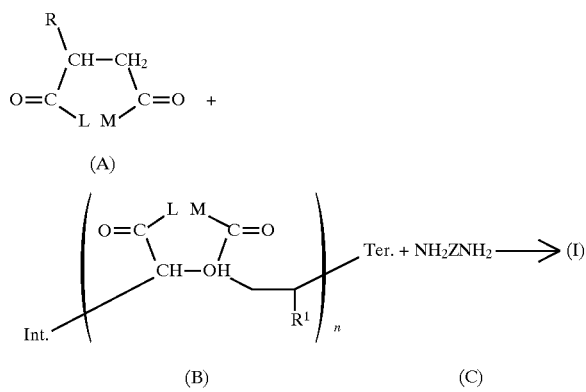

wherein R, R$^1$, Z, L, M, n, (Int) and (Ter) are as defined above.

Typically the above process is conducted by contacting from 0.5 to 10 equivalents of alkenyl or alkylsuccinic acid derivative (A) per mole of unsaturated acidic reagent copolymer (B) and from 0.4 to 1.0 equivalents of amine (C) per equivalent of alkenyl or alkylsuccinic acid derivative (A) plus unsaturated acidic reagent copolymer (B). In conducting this reaction we have generally found it convenient to first add the alkenyl or alkylsuccinic acid derivative and the unsaturated acidic reagent copolymer together and then add the polyamine. It may be desirable to conduct the reaction in an inert organic solvent. Optimum solvents will vary with the particular copolymer and can be determined from literature sources or routine experimentations. For example, in the case of maleic anhydride poly α-olefin copolymers, we found that 100N diluent oil and mixtures of C$_9$ aromatic solvents are acceptable solvents.

Typically, the reaction is conducted at temperatures in the range of about from 140° to 180° C., preferably 150° to 170° C. for about from 1 to 10 hours, preferably 4 to 6 hours. Typically the reaction is conducted at about atmospheric pressure; however, higher or lower pressures can also be used depending on the reaction temperature desired and the boiling point of the reactants or solvent As above noted, the reaction product will typically be a mixture, both because of the secondary products or byproducts and also because the reactants will typically be mixtures. In theory, pure compounds could be obtained, for example by using pure compounds as reactants and then separating out the desired pure compounds from the reaction product. However, commercially, the expense of this would rarely be justified and accordingly the commercial product will generally be a mixture in which formulas (I), (II), and (III) will be the predominant compounds.

Water, present in the system or generated by the reaction of the amine with the succinic or maleic anhydride moieties of (A) and (B) alkyl succinimide, is preferably removed from the reaction system during the course of the reaction via azeotroping or distillation. After reaction completion, the system can be stripped at elevated temperatures (typically 100° C. to 250° C.) and reduced pressures to remove any volatile components which may be present in the product.

The Alkenyl or AlkylSuccinic Acid Derivatives—
Reactant (A)

Alkyl and alkenylsuccinic acid derivatives having a calculated succinic ratio of about from 1:1 to 2.5:1, and preferably about from 1:1 to 1.5:1, may be used in the present process. More preferably, the alkyl or alkenyl succinic acid derivatives have a succination ratio of about from 1:1 to 1.2:1. Most preferably, alkyl or alkenylsuccinic anhydrides are used. Accordingly we prefer to use alkenyl succinic anhydride prepared by the thermal process, both because the calculated succination ratio of material prepared by this process is typically 1.0 to 1.2, and because the produce is essentially chlorine-free because chlorine is not used in the synthesis.

The thermal reaction of a polyolefin with maleic anhydride is well known and is described, for example, in U.S. Pat. No. 3,361,673. The less desirable is the chlorination process characterized by the reaction of a chlorinated polyolefin, with maleic anhydride, which is also well known and is described, for example, in U.S. Pat. No. 3,172,189. Various modifications of the thermal process and chlorination process are also well known, some of which are described in U.S. Pat. Nos. 4,388,471; 4,450,281; 3,018,250 and 3,024,195. Free radical procedures for preparing alkenyl succinic anhydrides are, for example, described in U.S. Pat. Nos. 5,286,799 and 5,319,030. All of the above referenced patents are hereby incorporated herein by reference in their entirety.

In accordance with the invention, the alkenyl or alkyl succinic anhydride reactant is derived from a polyolefin having a Mn from 1000 to 5000 and a Mw/Mn ratio of 1:1 to 5:1. In a preferred embodiment, the alkenyl or alkyl group of the succinimide has a Mn value from 1800 to 3000. Most preferred are alkenyl or alkyl substituents having a Mn of from 2000 to 2500.

Suitable polyolefin polymers for reaction with maleic anhydride include polymers comprising a major amount of $C_2$ to $C_5$ monoolefin, e.g., ethylene, propylene, butylene, iso-butylene and pentene. The polymers can be homopolymers, such as polyisobutylene, as well as copolymers of two or more such olefins, such as copolymers of: ethylene and propylene, butylene, and isobutylene, etc. Other copolymers include those in which a minor amount of the copolymer monomers (e.g., 1 to 20 mole percent), is a $C_4$ to $C_8$ nonconjugated diolefin, e.g., a copolymer of isobutylene and butadiene or a copolymer of ethylene, propylene and 1,4-hexadiene, etc.

A particularly preferred class of olefin polymers for reaction with maleic anhydride comprises the polybutenes, which are prepared by polymerization of one or more of 1-butene, 2-butene and isobutene. Especially desirable are polybutenes containing a substantial proportion of units derived from isobutene. The polybutene may contain minor amounts of butadiene, which may or may not be incorporated in the polymer. These polybutenes are readily available commercial materials well known to those skilled in the art. Examples of procedures illustrating the preparation of such material can be found, for example, in U.S. Pat. Nos. 3,215,707; 3,231,587; 3,515,669; 3,579,450; 3,912,764 and 4,605,808, hereby incorporated by reference for their disclosures of suitable polybutenes.

The alkenyl or alkylsuccinic anhydride may also be prepared using the so-called highly reactive or high methyl vinylidene polyalkylene, most commonly polyisobutylene, such as described in U.S. Pat. Nos. 4,152,499; 5,071,919; 5,137,980; 5,286,823; 5,254,649; published International Applications Numbers WO 93 24539-A1; WO 9310063-A1; and published European Patent Applications Numbers 0355895-A; 0565285A; and 0587381 A, all of which are hereby incorporated by reference in their entirety. Other polyalkenes can also be used including, for example, polyalkenes prepared using metallocene catalysts such as for example described in published German patent application DE 4313088A1.

The Unsaturated Acidic Reagent Copolymer— Reactant (B)

The unsaturated acidic reagent copolymers used in the present invention can be random copolymers or alternating copolymers, and can be prepared by known procedures. Further, in most instances, examples of each class are readily commercially available. Such copolymers may be prepared by the free radical reaction of an unsaturated acidic reagent with the corresponding monomer of the other unit of the copolymer. Thus, in the present case, the monomer will correspond to $R^1$ in formula (I) plus a vinyl group, i.e., $R^1$—CH=CH$_2$. Hence, where $R^1$ is phenyl the monomer will be styrene. Accordingly, the unsaturated acidic reagent copolymer can be prepared by the free radical reaction of an unsaturated acidic reagent, preferably maleic anhydride, with the corresponding $C_8$ to $C_{48}$ α-olefin, $C_8$ to $C_{28}$ polyalkylene, ethylene, styrene, 1,3-butadiene, $C_{3+}$ vinyl alkyl ether, or $C_{4+}$ vinyl alkanoate.

The copolymerization is conducted in the presence of a suitable free radical initiator; typically a peroxide type initiator, e.g. di(t-butyl) peroxide dicumyl peroxide or azo type initiator, e.g., isobutylnitrile type initiators. Procedures for preparing poly α-olefin copolymers are, for example, described in U.S. Pat. Nos. 3,560,455 and 4,240,916, hereby incorporated by reference in their entirety. Both patents also describe a variety of initiators.

Some examples of maleic anhydride α-olefin copolymers are:

Poly(styrene-co-maleic anhydride) resins

These materials are known as SMA® resins. There are two molecular weight versions. The low molecular weight resin is called SMA resin and is available from ARCO Chemical with styrene to maleic anhydride ratio's of 1:1, 2:1, and 3:1. The high molecular weight resin is produced by Monsanto (Lytron®), ARCO (Dylark®) or American Cyanamide (Cypress®). Other names for SMA copolymers are Styrolmol, Maron MS, and Provimal ST resins. In some cases partially esterified resins are also available.

Poly(ethylene-co-maleic anhydride) resins

These materials are manufactured by Monsanto under the trade name EMA®. They are also called Malethamer and Vinac resins.

Poly(alpha olefin-co-maleic anhydride) resins are available from Chevron Chemical as PA-18 (octadecene-1-co-maleic anhydride), or can be prepared as in Preparation 1. Alternately mixtures of alpha olefins can be used. These materials have been described in U.S. Pat. Nos. 3,461,108; 3,560,455; 3,560,456; 3,560,457; 3,580,893; 3,706,704; 3,729,450; and 3,729,451. Partially esterified olefin co maleic anhydride resins can also be used. Some examples of these types of resins are called Ketjenlube® resins available from AKZO Co.

Poly(isobutene-co-maleic anhydride) resins are called ISOBAM® and are manufactured by Curaray Co. Ltd. They are also available from Humphrey chemical Co. under the code K66.

Poly(butadiene-so-maleic anhydride) resins are called Maldene® and are made by Borg-Warner Corp.

Poly(methylvinylether-co-maleic anhydride) resins are sold by GAF Corporation under the name Gantrey An. Other names are called Visco Frey.

Poly(vinylacetate-co-maleic anhydride) resins are available from Monsanto and are called Lytron 897, 898, and 899. They are also called Pouimalya resins in Europe.

We have found that excellent results can be obtained using a copolymer prepared by the free radical polymerization of maleic anhydride and $C_{12}$ to $C_{18}$ α-olefins or olefin mixtures thereof.

The Polyamine Reactant (C)

The polyamine reactant should have at least three amine nitrogen atoms per mole, and preferably 4 to 12 amine nitrogens per molecule. Most preferred are polyamines having from about 6 to about 10 nitrogen atoms per molecule. The number of amine nitrogen atoms per molecule of polyamine is calculated as follows:

$$\text{Average number of nitrogen atoms in molecule of polyamine} = \frac{\% \text{N} \times M_{pa}}{14 \times 100}$$

wherein

% N=percent nitrogen in polyamine or polyamine mixture $M_{pa}$=number average molecular weight of the polyamine or polyamine mixture Preferred polyalkylene polyamines also contain from about 4 to about 20 carbon atoms, there being preferably from 2 to 3 carbon atoms per alkylene unit. The polyamine preferably has a carbon-to-nitrogen ratio of from 1:1 to 10:1.

Examples of suitable polyamines that can be used to form the compounds of this invention include the following: tetraethylene pentamine, pentaethylene hexamine, Dow E-100® heavy polyamine (number average $M_w$=303, available from Dow Chemical Company, Midland, Mich.), and Union Carbide HPA-X heavy polyamine (number average $M_w=275$, available from Union Carbide Corporation, Danbury, Conn.). Such amines encompass isomers, such as branched-chain polyamines, and the previously mentioned substituted polyamines, including hydrocarbyl-substituted polyamines. HPA-X heavy polyamine ("HPA-X") contains an average of approximately 6.5 amine nitrogen atoms per molecule. Such heavy polyamines generally afford excellent results.

The polyamine reactant may be a single compound but typically will be a mixture of compounds reflecting commercial polyamines. Typically the commercial polyamine will be a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine ("TETA"), substituted piperazines and pentaethylene hexamine, but the composition will be largely tetraethylene pentamine and the empirical formula of the total amine composition will closely approximate that of tetraethylene pentamine.

Other examples of suitable polyamines include admixtures of amines of various sizes, provided that the overall mixture contains at least 4 nitrogen atoms per molecule. Included within these suitable polyamines are mixtures of diethylene triamine ("DETA") and heavy polyamine. A preferred polyamine admixture reactant is a mixture containing 20% by weight DETA and 80% by weight HPA-X; as determined by the method described above, this preferred polyamine reactant contains an average of about 5.2 nitrogen atoms per mole.

Methods of preparation of polyamines and their reactions are detailed in Sidgewick's THE ORGANIC CHEMISTRY OF NITROGEN, Clarendon Press, Oxford, 1966; Noller's CHEMISTRY OF ORGANIC COMPOUNDS, Saunders, Philadelphia, 2nd Ed., 1957; and Kirk-Othmer's ENCYCLOPEDIA OF CHEMICAL TECHNOLOGY, 2nd Ed., especially Volumes 2, pp. 99–116.

Post-Treatments

We have found that the dispersancy of the present polymers is generally further improved by reaction with a cyclic carbonate. This may result in some reduction in fluorocarbon elastomer compatibility. However, this generally can be most than offset by reducing the concentration of the carbonated post-treated polymer in light of the increased dispersancy. The cyclic carbonate post-treatment is especially advantageous where the dispersant will be used in engines which do not have fluorocarbon elastomer seals. The resulting modified polymer has one or more nitrogens of the polyamino moiety substituted with a hydroxy hydrocarbyl oxycarbonyl, a hydroxy poly(oxyalkylene) oxycarbonyl, a hydroxyalkylene, hydroxyalkylenepoly(oxyalkylene), or mixture thereof.

The cyclic carbonate post-treatment is conducted under conditions sufficient to cause reaction of the cyclic carbonate with secondary amino group of the polyamino substituents. Typically, the reaction is conducted at temperatures of about from 0° C. to 250° C. preferably about from 100° C. to 200° C. Generally, best results are obtained at temperatures of about from 150° C. to 180° C.

The reaction may be conducted neat, wherein both the polymer and the cyclic carbonate are combined in the proper ratio, either alone or in the presence of a catalyst (such as an acidic, basic or Lewis acid catalyst). Depending on the viscosity of the polymer reactant, it may be desirable to conduct the reaction using an inert organic solvent or diluent, for example, toluene, xylene. Examples of suitable catalysts include, for example, phosphoric acid, boron trifluoride, alkyl or aryl sulfonic acid, alkali or alkaline carbonate. Generally, the same solvents or diluents as described above with respect to the preparation for the co-polymer (A) or polymer (I) can also be used in the cyclic carbonate post-treatment.

The reaction of polyamino alkenyl or alkyl succinimides with cyclic carbonates is known in the art and is described in U.S. Pat. No. 4,612,132, hereby incorporated by reference, in its entirety. Generally, the procedures described to post-treat polyamino alkenyl or alkyl succinimides with cyclic carbonates can also be applied to post-treat the present polymers.

A particularly preferred cyclic carbonate is 1,3-dioxolan-2-one (ethylene carbonate) because it affords excellent results and also because it is readily commercially available.

The molar charge of cyclic carbonate employed in the post-treatment reaction is preferably based upon the theoretical number of basic nitrogens contained in the polyamino substituent of the succinimide. Thus, when one equivalent of tetraethylene pentamine ("TEPA") is reacted with one equivalent of succinic anhydride and one equivalent of copolymer, the resulting bis succinimide will theoretically contain 3 basic nitrogens. Accordingly, a molar charge of 2 would require that two moles of cyclic carbonate be added for each basic nitrogen or in this case 6 moles of cyclic carbonate for each mole equivalent of polyalkylene succinimide or succinimide prepared from TEPA. Mole ratios of the cyclic carbonate to the basic amine nitrogen of the polyamino alkenyl succinimide employed in the process of this invention are typically in the range of from about 1:1 to about 4:1; although preferably from about 2:1 to about 3:1.

As described in U.S. Pat. No. 4,612,132, cyclic carbonates may react with the primary and secondary amines of a polyamino alkenyl or alkyl succinimide to form two types of compounds. In the first instance, strong bases, including unhindered amines such as primary amines and some secondary amines, react with an equivalent of cyclic carbonate to produce a carbamic ester. In the second instance, hindered bases, such as hindered secondary amines, may react with an equivalent of the same cyclic carbonate to form a hydroxyalkyleneamine linkage. (Unlike the carbamate products, the hydroxyalkyleneamine products retain their basicity.) Accordingly, the reaction of a cyclic carbonate may yield a mixture of products. When the molar charge of the cyclic carbonate to the basic nitrogen of the succinimide is about 1 or less, a large portion of the primary and secondary amines of the succinimide will be converted to hydroxy hydrocarbyl carbamic esters with some hydroxyhydrocarbylamine derivatives also being formed. As the mole ratio is raised above 1 increased amounts of poly(oxyalkylene) polymers of the carbamic esters and the hydroxyhydrocarbylamine derivatives are produced.

Both the polymers and post-treated polymers of this invention can also be reacted with boric acid or a similar boron compound to form borated dispersants having utility within the scope of this invention. In addition to boric acid (boron acid), examples of suitable boron compounds include boron oxides, boron halides and esters of boric acid. Generally from about 0.1 equivalents to 10 equivalents of boron compound to the modified succinimide may be employed.

In addition to the carbonate and boric acids post-treatments both the compounds may be post-treated, or further post-treatment, with a variety of post-treatments designed to improve or impart different properties. Such post-treatments include those summarized in columns 27–29 of U.S. Pat. No. 5,241,003, hereby incorporated by reference. Such treatments include, treatment with:

Inorganic phosphorous acids or anhydrates (e.g., U.S. Pat. Nos. 3,403,102 and 4,648,980);
Organic phosphorous compounds (e.g., U.S. Pat. No. 3,502,677);
Phosphorous pentasulfides;
Boron compounds as already noted above (e.g., U.S. Pat. Nos. 3,178,663 and 4,652,387);
Carboxylic acid, polycarboxylic acids, anhydrides and/or acid halides (e.g., U.S. Pat. Nos. 3,708,522 and 4,948,386);
Epoxides polyepoxiates or thioexpoxides (e.g., U.S. Pat. Nos. 3,859,318 and 5,026,495);
Aldehyde or ketone (e.g., U.S. Pat. No. 3,458,530);
Carbon disulfide (e.g., U.S. Pat. No. 3,256,185);
Glycidol (e.g., U.S. Pat. No. 4,617,137);
Urea, thourea or guanidine (e.g., U.S. Pat. Nos. 3,312,619; 3,865,813; and British Patent GB 1,065,595);
Organic sulfonic acid (e.g., U.S. Pat. No. 3,189,544 and British Patent GB 2,140,811);
Alkenyl cyanide (e.g., U.S. Pat. Nos. 3,278,550 and 3,366,569);
Diketene (e.g., U.S. Pat. No. 3,546,243);
A diisocyanate (e.g., U.S. Pat. No. 3,573,205);
Alkane sultone (e.g., U.S. Pat. No. 3,749,695);
1,3-Dicarbonyl Compound (e.g., U.S. Pat. No. 4,579,675);
Sulfate of alkoxylated alcohol or phenol (e.g., U.S. Pat. No. 3,954,639);
Cyclic lactone (e.g., U.S. Pat. Nos. 4,617,138; 4,645,515; 4,668,246; 4,963,275; and 4,971,711);
Cyclic carbonate or thiocarbonate linear monocarbonate or polycarbonate, or chloroformate (e.g., U.S. Pat. Nos. 4,612,132; 4,647,390; 4,648,886; 4,670,170);
Nitrogen-containing carboxylic acid (e.g., U.S. Pat. No. 4,971,598 and British Patent GB 2,140,811);
Hydroxy-protected chlorodicarbonyloxy compound (e.g., U.S. Pat. No. 4,614,522);
Lactam, thiolactam, thiolactone or ditholactone (e.g., U.S. Pat. Nos. 4,614,603 and 4,666,460);
Cyclic carbonate or thiocarbonate, linear monocarbonate or plycarbonate, or chloroformate (e.g., U.S. Pat. Nos. 4,612,132; 4,647,390; 4,646,860; and 4,670,170);
Nitrogen-containing carboxylic acid (e.g., U.S. Pat. No. 4,971,598 and British Patent GB 2,440,811);
Hydroxy-protected chlorodicarbonyloxy compound (e.g., U.S. Pat. No. 4,614,522);
Lactam, thiolactam, thiolactone or dithiolactone (e.g., U.S. Pat. Nos. 4,614,603, and 4,666,460);
Cyclic carbamate, cyclic thiocarbamate or cyclic dithiocarbamate (e.g., U.S. Pat. Nos. 4,663,062 and 4,666,459);
Hydroxyaliphatic carboxylic acid (e.g., U.S. Pat. Nos. 4,482,464; 4,521,318; 4,713,189);
Oxidizing agent (e.g., U.S. Pat. No. 4,379,064);
Combination of phosphorus pentasulfide and a polyalkylene polyamine (e.g., U.S. Pat. No. 3,185,647);
Combination of carboxylic acid or an aldehyde or ketone and sulfur or sulfur chloride (e.g., U.S. Pat. Nos. 3,390,086; 3,470,098);
Combination of a hydrazine and carbon disulfide (e.g. U.S. Pat. No. 3,519,564);
Combination of an aldehyde and a phenol (e.g., U.S. Pat. Nos. 3,649,229; 5,030,249; 5,039,307);
Combination of an aldehyde and an O-diester of dithiophosphoric acid (e.g., U.S. Pat. No. 3,865,740);
Combination of a hydroxyaliphatic carboxylic acid and a boric acid (e.g., U.S. Pat. No. 4,554,086);
Combination of a hydroxyaliphatic carboxylic acid, then formaldehyde and a phenol (e.g., U.S. Pat. No. 4,636,322);
Combination of a hydroxyaliphatic carboxylic acid and then an aliphatic dicarboxylic acid (e.g., U.S. Pat. No. 4,663,064);
Combination of formaldehyde and a phenol and then glycolic acid (e.g., U.S. Pat. No. 4,699,724);
Combination of a hydroxyaliphatic carboxylic acid or oxalic acid and then a diisocyanate (e.g. U.S. Pat. No. 4,713,191);
Combination of inorganic acid or anhydride of phosphorus or a partial or total sulfur analog thereof and a boron compound (e.g., U.S. Pat. No. 4,857,214);
Combination of an organic diacid then an unsaturated fatty acid and then a nitrosoaromatic amine optionally followed by a boron compound and then a glycolating agent (e.g., U.S. Pat. No. 4,973,412);
Combination of an aldehyde and a triazole (e.g., U.S. Pat. No. 4,963,278);
Combination of an aldehyde and a triazole then a boron compound (e.g., U.S. Pat. No. 4,981,492);
Combination of cyclic lactone and a boron compound (e.g., U.S. Pat. Nos. 4,963,275 and 4,971,711).

Lubricating Oil Compositions and Concentrates

The compositions of this invention are compatible with fluorocarbon elastomer seals, at concentrations at which they are effective as detergent and dispersant additives in lubricating oils. When employed in this manner, the modified polyamino alkenyl or alkyl succinimide additive is usually present in from 1 to 5 percent by weight (on a dry polymer basis) to the total composition and preferably less than 3 percent by weight (on a dry or actives polymer basis). Dry or actives basis indicates that only the active ingredient of this invention are considered when determining the amount of the additive relative to the remainder of a composition (e.g., lube oil composition, lube oil concentrate, fuel composition or fuel concentrate). Diluents and any other inactives are excluded. Unless otherwise indicated, in describing the lubricating oil and final compositions or concentrates, dry or active ingredient contents are intended with respect to the polyalkylene succinimides. This includes the novel polyalkylene succinimides of the present invention and also other reaction product or byproducts in the reaction product mixture which function as dispersants.

The lubricating oil used with the additive compositions of this invention may be mineral oil or synthetic oils of lubricating viscosity and preferably suitable for use in the crankcase of an internal combustion engine. Crankcase lubricating oils typically have a viscosity of about 1300 cSt at 0° F. (−17.8° C.) to 22.7 cSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity such as didodecyl benzene can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimmer with 75 to 90 weight percent 150 SUS (100° F.) mineral oil gives an excellent lubricating oil base.

Other additives which may be present in the formulation include detergents (overbased and non-overbased), rust inhibitors, foam inhibitors, corrosion inhibitors, metal deactivators, pour point depressants, antioxidants, wear inhibitors, zinc dithiophosphates and a variety of other well-known additives.

It is also contemplated the modified succinimides of this invention may be employed as dispersants and detergents in hydraulic fluids, marine crankcase lubricants and the like. When so employed, the modified succinimide is added at from 0.1 to 5 percent by weight (on a dry polymer basis) to the oil, and preferably at from 0.5 to 5 weight percent (on a dry polymer basis).

Additive concentrates are also included within the scope of this invention. The concentrates of this invention usually include from 90 to 10 weight percent of an organic liquid diluent and from 10 to 90 weight percent (on a dry polymer basis) of the additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Fuel Compositions and Concentrates

Typically the fuel composition will about from 10 to 10,000 weight parts per million, preferably from 30 to 2,000 weight parts per million, of base fuel. This is based on active ingredient including the other dispersant reaction products as well as the compounds of formula (I) but excluding inactives for example diluent oil and any unreacted alkene or poly α-olefins etc carried through from the preparation of succinic anhydride (A) or copolymer (B). If other detergents are present, a lesser amount of the modified succinimide may be used. Optimum concentrations can vary with the particular base oil and the presence of other additives, but, can be determined by routine procedures.

The compositions of this invention may also be formulated as a fuel concentrate, using an inert stable oleophilic organic solvent boiling in the range of about 150° F. to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. The present fuel concentrate will typically contain about from 20 to 60 wt. % of the present composition or an active ingredient basis.

PREPARATIONS AND EXAMPLES

A further understanding of the invention can be had in the following nonlimiting Preparations and Examples. Wherein unless expressly stated to the contrary, all temperatures and temperature ranges refer to the Centigrade system and the term "ambient" or "room temperature" refers to about 20° C.–25° C. The term "percent" or "%" refers to weight percent and the term "mole" or "moles" refers to gram moles. The term "equivalent" refers to a quantity of reagent equal in moles, to the moles of the preceding or succeeding reactant recited in that example in terms of finite moles or finite weight or volume.

Preparation 1

Maleic Anhydride—$C_{14-18}$ Alpha Olefin Copolymer Concentrate

This example illustrates a suitable procedure for preparing the title compound. In this example 170 grams of a mixture of $C_{14}$, $C_{16}$ and $C_{18}$ Olefins and 50 g of $C_9$ aromatic solvent is heated to 300° F. (149° C.) then sparged with nitrogen to remove entrained air and then cooled to 150° F. (66° C.). 75 grams of maleic anhydride is added and the temperature of the mixture raised to 255° F. (124° C.). A total of 14 g of Di-t-butyl peroxide is added in five equal portions at about 30-minute increments over a period of two hours. During the additions the temperature is maintained between 255° F. to 265° F. and then allowed to slowly increase to 300° F. (149° C.) and held at about this temperature for two hours and then cooled affording a mixture of the title composition and solvent. This is used without further purification.

Preparation 2

Preparation of Pibsa 2200 Succinic Ratio=1.1)

A 35.186 Kg, 16 mole, of a 2200 Mn polybutene sold under the trademark Parapol 2200 by Exxon Chemical Company) is charged to a reactor and heated to 232° C. During this time, the reactor is pressurized to 40 psig with nitrogen and then vented three times to remove air. The reactor is repressurized to 24.7 psia and 1500 g maleic anhydride then added over a thirty-minute period. Following this, another 4581 g of maleic anhydride is added over a 4-hour period. The total charge mole ratio (CMR) of maleic anhydride to polybutene is 3.88. After the maleic anhydride addition is completed, the reaction is held at 232° C. for 1.5 hours and then cooled. Any unreacted maleic anhydride is removed by vacuum distillation at 0.4 psia a light neutral diluent oil is added to the stripped product and heated to 160° C. for 24 hours and was then filtered. This product was found to contain 37.68 wt. % actives and had a saponification number of 19.7 mg KOH/g sample. The succinic ratio was 1.1 based on a polybutene molecular weight of 2246 determined by gel permeation chromatography ("GPC").

Preparation 3

Preparation of Pibsa 1300 (Succinic Ratio=1.1)

The procedure of Preparation 2 is repeated except that a 1300 Mn polybutene sold under the trademark Parapol 1300 by Exxon Chemical Company is used instead of Parapol 2200™. After dilution with diluent oil and filtration, this product was found to contain 49.6 wt. % actives and a saponification number of 42.2 mg KOH/g sample. The succinic ratio was 1.1 based on a polybutene molecular weight of 1300.

Preparation 4

Preparation of Pibsa 2200 Succinic Ratio=1.5)

Parapol 2200™, 42.8 Kg, 19.45 mol, is charged to a reactor and the temperature increased to 150° C. During this time, the reactor is pressurized to 40 psig with nitrogen and then vented three times to remove oxygen. Then at 150° C., maleic anhydride, 4294 g, 43.82 mol, and di-t-butylperoxide, 523 g, 3.58 mol, is added. The first 25% is added over 30 minutes. The remainder is then added over 11.5 hours. The CMR of maleic anhydride to polybutene is 2.25. The mixture is held at 150° C. for one hour and then heated at 190° C. for 1 hour to destroy any remaining di-t-butylperoxide. Then vacuum is applied to the reactor and the unreacted maleic anhydride is removed. This material is then diluted with a light neutral oil and filtered. The product after filtration had a saponification number of 31.6 mg KOH/g sample and contained 45.62 wt. % actives. The succinic ratio was 1.5 for this material based on a polybutene molecular weight of 2200.

Preparation A
Preparation of TETA Polyisobutenyl (MN 2200) Succinimide (Succinic Ratio=1.1)
(a) Succinimide To a three neck flask equipped with an overhead stirrer, nitrogen inlet tube and a Dean Stark trap was added 300.7 g Pibsa (SAP no.=19.7 mg KOH/g sample, 0.0464 mol) that was prepared using the procedure of preparation 2. To this was then added at 130° C. 3.39 g TETA with stirring.

The mixture was heated for a total of 6.5 hrs. Then the reaction was cooled.

A total of 0.8 ml water was recovered. The analytical data for this compound is found in Table 1.
(b) Post treatment
Preparation of Ethylene Carbonate-Treated BIS TETA Polyisobutenyl (Mn 2200) (succinic ratio=1.1)

In this example 3.33 g ethylene carbonate (0.0378 mol) was added to 100 g of the BIS TETA Polyisobutenylsuccinimide from preparation A. This was heated for 4 hours. Then the reaction was cooled to give the title compound. The analytical data for this material is found in Table 1.

Preparation B
Preparation of Heavy Polyamine Polyisobutenyl (Mn 2200) Succinimide (Succinic Ratio=1.1)
(a) Succinimide To a 1 L three-necked flask equipped with a Dean Stark trap is added 304.3 g (0.0469 mol) of PIBSA (SAP number= 17.3 mg KOH/g sample), prepared using the procedure from Preparation 2. This is heated to 130° C. under nitrogen with stirring and to this is added 6.45 g (0.02345 mol) of a heavy amine sold under the trade name HPA-X, by Union Carbide Company over 0.5 hours. The temperature was increased to 165° C. The amine/PIBSA CMR was 0.5. The reaction is heated an additional 4 hours at 165° C. while distilling off water. A total of 0.8 cc water was removed. This product was analyzed and found to contain 0.82% N, 16.6 TBN, 0.98 TAN, a viscosity at 100° C. of 431.8 cSt and a specific gravity at 15° C. of 0.9149 The product contained about 40% active material.
(b) Post-treatment
Preparation of Ethylene Carbonate-Treated BIS HPA-X Polyisobutenyl (Mn 2200) (succinic ratio=1.1)

In this example 7.4 g of ethylene carbonate is added over thirty minutes to 100.5 g of Bis HPA-X PIBSA 2200 (succinic ratio=1.1) at 100° C. The temperature of the reaction mixture is increased to 165° C. over 2.5 hours and then maintained at this temperature for 2 hours affording the title compound.

Preparation C
Preparation of Polyalkylene Succinimide Using DETA, PIBSA 950, and a C16 Alpha Olefin-Maleic Anhydride Copolymer To a 3 liter round bottom flask equipped with a magnetic stirrer, Dean Startk trap, and nitrogen inlet was added 1950 g Pibsa 950 T (1 mol), which had a SAP number of 57.5 mg KOH/g sample, and 1213 g $C_{16}$ alpha olefin/maleic anhydride copolymer (1.1 mol), dissolved in $C_9$ aromatic solvent, which had a SAP number of 102 mg KOH/g sample. The Pibsa 950 T/alpha olefin copolymer ratio was 48/52. This was heated to 160° C. and to this was added over twenty five minutes, 108 g diethylene triamine (1.05 mole) with stirring. The amine/Pibsa CMR was 0.5. After 2 hours heating, the $C_9$ aromatic solvent was then removed in vacuo. A total of 2460 g product was recovered, which had 1.69 % N, and a viscosity at 100° C. of 853.

Example 1
Preparation of Polymeric Succinimide Using HPA, and $C_{14}$–$C_{18}$ Alpha-Olefin Maleic Anhydride Copolymer
(a) Polymer In this example, 658.4 (0.138 mol) of a polyisobutenyl (Mn 2200) succinic anhydride having a succination ratio of 1.1 and a SAP number of 23.6 mg of potassium hydroxide/g is added to a 2 L three neck flask equipped with a Dean stark trap and condenser followed by the addition of a solution of containing 59.5 g (0.059 mol) of a $C_{14}$–$C_{18}$ α-olefin-maleic anhydride copolymer in a C-9 ml of a $C_9$ aromatic solvent (a mixture of alkylbenzenes having nine carbon atoms). The mixture is heated to 100° C. and 27.21 g (0.099 mol) of a heavy polyamine having an Mn of 275 containing an average of 6.5 amine nitrogen atoms per molecule sold under the Tradename HPA-X by Union Carbide Company. The temperature of the mixture is increased to 165° C. and maintained at this temperature for six hours with stirring. The C9 aromatic solvent is then removed by vacuum distillation affording a viscous liquid product having a nitrogen content of 1.21 wt. %, a TBN of 22.64 mg KOH/g, a TAN of 0.60 mg/g and a viscosity 440 cSt at 100° C.

Example 1 EC
Ethylene Carbonite-Post-Treated Polymeric Succinimide of Example 1

33.06 g (0.376 mol) of ethylene carbonate is slowly added to 304.3 g of the above reaction product above at 100° C. The temperature is increased to 165° C. and maintained at this temperature for 3½ hours. The resulting reaction product mixture had a nitrogen content of 1.15 wt. %, a TBN of 15.9 mg KOH/g, a TAN of 0.15 mg KOH/g and a viscosity of 812 cSt at 100° C.

Example 2–6

Examples 2–6 are prepared following the same procedures as described in Example 1 but varying the ratio of polyisobutenyl succinic anhydride to copolymer based on succinic anhydride equivalents or varying the particular polyamine but not the mole ratio of polyamine; 0.5 moles of the indicated polyamine were added per mole equivalent succinic anhydride in both the alkenylsuccinic anhydride and maleic anhydride copolymer regardless of the particular polyamine. The nitrogen content, TBN, viscosity, and TAN number for these examples and Example 1 are reported in Table 1. In addition, for comparative purposes, the Table also lists a polyisobutenyl (Mn 2200) succinimide prepared by the same general procedure as illustrated by Preparation A using either triethylenetetraamine or heavy polyamine (HPA-X) and a mole ratio of 0.5 mole of polyamine per mole of succinic anhydride and the corresponding ethylene carbonite post-treated derivatives prepared by the post-treatment illustrated by Preparation B. In each case the polyisobutenylsuccinic anhydride reactant was prepared by the thermal process using a conventional Mn 2200 polyisobutene such as Parapol 2200™.

TABLE I

ANALYTICAL DATA FOR POLYISOBUTENYLSUCCINIMIDE-MALEIC ANHYDRIDE $C_{14-18}$ OLEFIN COPOLYMER

| Example No. | Amine | Mole Ratio[1] PIBSA/ Copolymer | N Wt. % | TBN mg KOH/g | Vis. at 1000 C., cSt | TAN mg KOH/g |
|---|---|---|---|---|---|---|
| 1 | HPA-X | 70/30 | 1.21 | 22.6 | 440 | 0.6 |
| 1-EC | HPA-X | 70/30 | 1.15 | 15.9 | 812 | 0.15 |
| 2 | TETA[2] | 90/10 | 0.63 | 10.1 | 437 | 0.79 |
| 2-EC[3] | TETA | 90/10 | 0.59 | 8.5 | 430 | 0.07 |
| 3 | HPA[4]-X | 90/10 | 0.93 | 21.6 | 443 | 0.44 |
| 3-EC | HPA-X | 90/10 | 0.95 | 13.6 | 662 | 0.09 |
| 4 | TETA | 70/30 | 0.77 | 11.2 | 439 | 0.43 |
| 4-EC | TETA | 70/30 | 0.78 | 9.2 | 441 | 0.05 |
| 5 | TETA | 50/50 | 0.99 | 13.7 | 482 | 2.15 |
| 5-EC | TETA | 50/50 | 0.96 | 10.4 | 491 | 0.05 |
| 6 | HPA-X | 50/50 | 1.59 | 26.3 | 567 | 1.33 |
| 6-EC | HPA-X | 50/50 | 1.46 | 18.7 | 2676 | 0.07 |
| COMPARISON PIB SUCCINIMIDES | | | | | | |
| A | TETA | | 0.53 | 6.7 | 421 | 1.11 |
| A-EC | TETA | | 0.39 | 3.9 | 395 | 0.07 |
| B | HPA | | 0.82 | 16.6 | 432 | 0.98 |
| B-EC | HPA | | 0.76 | 8.8 | 599 | 0.09 |
| C | DETA | 50/50 | 1.69 | — | 854 | — |

[1]Mole ratio of polyisobutenylsuccinic anhydride to copolymer based on succinic anhydride units in each
[2]Triethylenetetraamine
[3]Ethylene carbonate treated
[4]Heavy polyamine sold under this Trade Name by Union Carbide Company Example 7
Preparation of Polymeric Succinimide Using Pibsa (Mn 2200), HPA, and a Styrene Maleic Anhydride Copolymer of Polyisobutylene (Mn 2200) and Poly(Maleic Anhydride-Styrene) Copolymer
a) Polymer
The title compound can be prepared by admixing 0.6 mol of the same heavy polyamine described in Example 1 to a mixture of 0.4 mol of poly(maleic anhydride-styrene) copolymer and 0.6 mol of polyisobutylene (Mn 2200) succinic anhydride having a succination ratio of 1.1 at 100° C. in a flask equipped with a Dean Stark trap and condenser. The mixture is stirred at this temperature for six hours. The mixture is then distilled under vacuum to remove volatiles affording the title compound as the principal product.
b) Post-treatment
The reaction product is then mixed with 0.76 mol of ethylene carbonate for about four hours at about 160° C. affording the ethylene carbonate post-treated derivative of the title composition.

Example 8
Tetraethylene Pentamine of Polyisobutylene (Mn 2200) Succinimide and Poly(Maleic Anhydride-Ethylene) Copolymer
a) Polymer
The title compound can be prepared by admixing 0.5 mole of tetraethylene pentamine to a mixture of 0.7 mole of polyisobutylene (Mn 2200) succinic anhydride having a succination ratio of 1.3 and 0.3 mol of poly(maleic anhydride ethylene) copolymer in 100 ml (solvent) at 1000° C. in a flask equipped with a Dean stark trap and condenser. The mixture is stored at this temperature for 6 hours and then distilled to remove the solvent affording the title compound as the principal product of the remaining mixture.
b) Post-treatment
0.71 mol of ethylene carbonate is added to the polymer reaction product and heat at about 165° C. for about four hours affording the ethylene carbonate post-treated derivative of the title compound.

Example 9
Polyamine of Polyisobutylene (Mn 1300) Succinimide and Poly(Maleic Anhydride-$C_{24}$ α Olefin) Copolymer
a) Polymer
The title compound can be prepared by admixing 0.5 mole of the same heavy polyamine described in Example 1 to a mixture of 0.7 mole of polyisobutylene (Mn 1300) succinic anhydride having a succination ratio of 1.5 and 0.3 mol of poly(maleic anhydride $C_{24}$ α-olefin) copolymer in 150 ml ($C_9$ aromatic, cholorobenzene, toluene or dioxane solvent) at 100° C. in a flask equipped with a Dean stark trap and condenser. The mixture is stored at this temperature for 6 hours and then distilled to remove the solvent affording the title compound as the principal product of the remaining mixture.
b) Post-treatment
0.71 mol of ethylene carbonate is added to the polymer reaction product and heat at about 160° C. for about four hours affording the ethylene carbonate post-treated derivative of the title compound.

Example 10
Polyamine of Polyisobutylene (Mn 2200) Succinimide and Poly(Maleic Anhydride-1,3-butadiene) Copolymer
a) Polymer
The title compound can be prepared by admixing 0.5 mole of the same heavy polyamine described in Example 1 to a mixture of 0.6 mole of polyisobutylene (Mn 2200) succinic anhydride having a succination ratio of 1.1 and 0.4 mol of poly(maleic anhydride-1,3-butadiene) copolymer in 50 ml (chlorobenzene) at 100° C. in a flask equipped with a Dean stark trap and condenser. The mixture is stored at this temperature for 6 hours and then distilled to remove the solvent affording the title compound as the principal product of the remaining mixture.
b) Post-treatment
0.71 mol of ethylene carbonate is added to the polymer reaction product and heat at about 165° C. for about four hours affording the ethylene carbonate post-treated derivative of the title compound.

Example 11
Polyamine of Polyisobutylene (Mn 1300) Succinimide and Poly(Maleic Anhydride-Methyl Vinyl Ether) Copolymer
a) Polymer
The title compound can be prepared by admixing 0.5 mole of the same heavy polyamine described in Example 1 to a mixture of 0.8 mole of polyisobutylene (Mn 1300) succinic anhydride having a succination ratio of 1.1:1 and 0.2 mol of poly(maleic anhydride-methyl vinyl ether) copolymer in 200 ml n-methyl pyrrolidoe at 100° C. in a flask equipped with a Dean stark trap and condenser. The mixture is stored at this temperature for 6 hours and then distilled to remove the solvent affording the title compound as the principal product of the remaining mixture.

b) Post-treatment 0.71 mol of ethylene carbonate is added to the polymer reaction product and heat at about 170° C. for about four hours affording the ethylene carbonate post-treated derivative of the title compound.

Example 12
Polyamine of Polyisobutylene (Mn 2200) Succinimide and Poly(Maleic Anhydride-Vinylacetate) Copolymer a) Polymer The title compound can be prepared by admixing 0.5 mole of the same heavy polyamine described in Example 1 to a mixture of 0.5 mole of polyisobutylene (Mn 2200) succinic anhydride having a succination ratio of 10 1.1:1 and 0.5 mol of poly(maleic anhydride-vinylacetate) copolymer in 200 ml dimethyl fluoride at 100° C. in a flask equipped with a Dean stark trap and condenser. The mixture is stored at this temperature for 6 hours and then distilled to remove the solvent affording the title compound as the principal product of the remaining mixture.

b) Post-treatment 0.71 mol of ethylene carbonate is added to the polymer reaction product and heat at about 170° C. for about four hours affording the ethylene carbonate post-treated derivative of the title compound.

Example 13
Lubricating Oil Dispersancy

The effectiveness of the compositions reported in Table I as was determined by the Panel Coker Bench Test and by the Soot Thickening Test. The results of this testing are reported in Table III.

1. Panel Coker Bench Test

In this test 200 g of the lubricating oil composition being tested is weighed into a 400 ml beaker. The test composition is a mixture of containing 8 wt. of the dispersant to be tested, 36 millimoles of an overbased phenate detergent and 18 millimoles of a zinc dithiophosphate wear inhibitor in Citcon® 350N diluent oil. To this is added 0.2 ml of a catalyst solution. The catalyst solution consists of a mixture of 62.12 g of copper naphthenate solution (7.88 wt. % copper) and 48.04 g iron naphtenate (6.12% iron) dissolved in pearl oil to 200 ml. This gave a copper content of 25 ppm and an iron content of 15 ppm in the oil. The oil and catalyst solution then stirred together for one minute. The test composition is then poured into the sump of the panel coker apparatus and a new plate (weighed to 0.0001 g) is installed. The following conditions are used for the panel coker test. The plate temperature is 300° C., the sump temperature is 18° C., the run time is 4 hours, the air flow rate is 60 cc/min. During the test the spinner is on for 12 seconds then off for 78 seconds. During the time the spiner is on the test composition is splashed onto the plate. Then with the spinner off, the test composition slowly drains off the surface of the plate. The spinner on/off cycle is continued for 4 hours after which time the plate was removed, rinsed with hexane and dried. The plate is weighed to 0.0001 g and the weight gain is reported as weight of total deposit. Thus the lower the weight the better the result.

2. Soot Thickening Test

In this test 98.0 g of the test lubricating oil composition is weighed and placed into a 250 milliliter beaker. The lubricating oil composition contained 8 wt. % on as is basis of the test dispersant 50 millimoles of an overbased phenate detergent, 18 millimoles of a zinc dithiophosphate wear inhibitor and 7.3 wt. % of a VI improver, in 85% 150N oil, 15% 600N oil. To this is added 2.0 g Vulcan XC-72R™ carbon black from Cabot Co. The mixture is stirred and then stored for 16 hr in a desiccator. A second sample of the lubricating oil composition, but without the carbon black, is mixed for 60 sec. using a Willems Polytron Homogenizer—Model PF 45/6 and then degased in a vacuum oven for 30 minutes at 50°–55° C. The viscosity of the two test compositions is then measured at 100° C. using a capillary viscometer. The percent viscosity increase is calculated by comparing the viscosity in the presence and absence of carbon black. Thus the lower the percent viscosity increase the better the dispersancy of the dispersant.

TABLE III

DISPERSANCY
PANEL COKER AND SOOT THICKENING

| EXAMPLE No. | Polyamine Description | Mole Rate PIBSA/ Copolymer | Panel Coker, mg | Soot Thickening, % Vis. Incr. |
|---|---|---|---|---|
| 1 | Bis HPA | 70/30 | 156.8 | 117 |
| 1 EC | EC Bis HPA | 70/30 | 61 | 24 |
| 2 | Bis TETA | 90/10 | 4 | 295 |
| 2 EC | EC Bis TETA | 90/10 | 13.4 | 87 |
| 3 | BIS HPA | 90/10 | 29.4 | 146 |
| 3 EC | EC Bis HPA | 90/10 | 4.3 | 25 |
| 4 | Bis TETA | 70/30 | 66.6 | 191 |
| 4 EC | EC Bis TETA | 70/30 | 71.2 | 36 |
| 5 | Bis TETA | 50/50 | 120.2 | 173 |
| 5 EC | EC Bis TETA | 50/50 | 311.7 | 37 |
| 6 | Bis HPA | 50/50 | 299.9 | 48 |
| 6 EC | EC Bis HPA | 50/50 | 311.7 | 30 |
| COMPARISON SUCCINIMIDES | | | | |
| A | TETA PIBSA 2200T | | 10.7 | 345 |
| A-EC | TETA PIBSA 2200T | | — | — |
| B | HPA PIBSA 2200T | | 7.5 | 310 |
| B-EC | HPA PIBSA 2200T | | — | — |

Example 14
Sequence VE Engine Test

The ethylene carbonate treated reaction product of Example 1 EC was formulated into a lubricating oil composition with a mixture of 150N and 100N mineral oil at a concentration of 5.3 wt. % (based on the reaction product mixture). The lubricating oil composition also contained small amounts of phenate and sulfonate detergents, a zinc dithiophosphate wear inhibitor and a viscosity index improver such as conventionally used in passenger car crankcase lubrication oils.

The dispersant performance of the composition was tested using the Sequence VE Engine test procedure defined in ASTM proposed Method: 212. This test assesses a lubricant's ability to provide adequate wear and deposit control under stop-and-go conditions. The test measures rocker cover sludge ("RCS"); average engine sludge ("AES"), piston skirt varnish ("PSV"); average engine vanish ("AEV") average cam wear ("ACW"), and maximum cam wear ("MCW").

The results of this testing is shown in Table IV. The pass limits for each performance measure is also indicated in the table. As can be seen from the table, with the exception of example C which contains a 950 molecular weight polybutene tail, the lubricating composition passed each performance measure.

TABLE IV

| Example No. | RCS | AES | PSV | AEV | ACW | MCW |
|---|---|---|---|---|---|---|
| 1 EC | 9.17 | 9.15 | 7.20 | 6.84 | 1.12 | 1.00 |
| Pass Limits | 7.00 (min.) | 9.00 (min.) | 6.50 (min.) | 5.00 (min.) | 5.00 max in mils) | 15.00 (max in mils) |
| B-EC | 8.56 | 9.15 | 7.17 | 6.55 | 0.89 | 1.25 |
| C | 1.9 | 4.8 | 6.6 | 4.7 | 5.0 | 11.2 |

While the present invention has been described with reference to specific embodiments, this application is intended to cover those various changes and substitutions that may be made by those skilled in the art without departing from the spirit and scope of the appended claims.

What is claimed is:

1. A dispersant composition comprising
   (a) a polymer having the general formula:

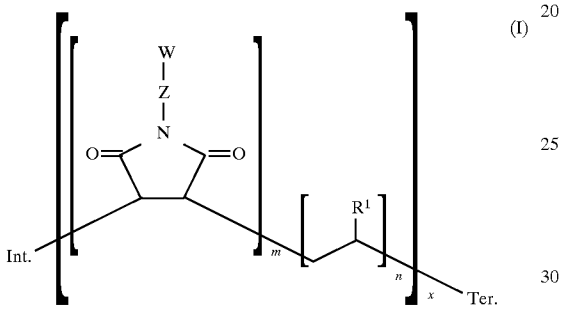
(I)

wherein:
W is a mixture of nitrogen-containing groups consisting of

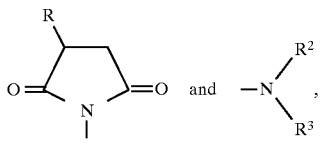

R is a polyalkyl or polyalkylene having a number average molecular weight of at least 1000,
$R^1$ is an alkyl having from 10 to 24 carbon atoms;
Z is a polyalkylene polyamine linking radical;
m is a whole integer of from 1 to 3
n is a whole integer of from 1 to 3;
x is a whole integer of from 1 to 100;
Int. is an initiating radical;
Ter. is a terminating group; and
wherein $R^2$ and $R^3$ are independently hydrogen, alkyl, phenyl, or taken together are alkylene to give a ring group; and
   (b) and at least one compound of the formulas:

(II)

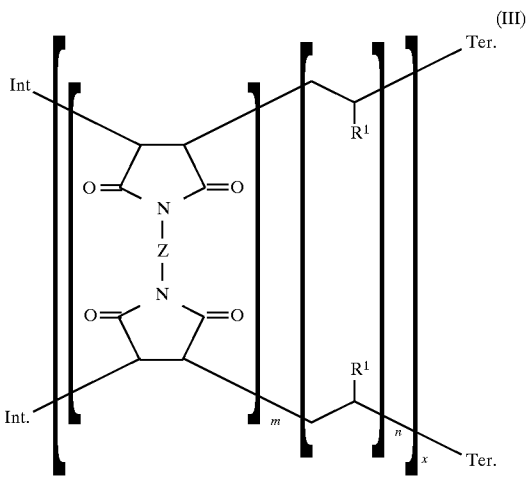
(III)

2. The dispersant composition of claim 1 wherein R has a number average molecular weight of from 1800 to 3000.

3. The dispersant composition of claim 1 wherein $R^1$ is an alkyl having from 12 to 18 carbon atoms.

4. The dispersant composition of claim 1 wherein x is a whole integer of from 2 to 20.

5. A concentrate comprising from 20 to 60 wt. % of the composition of claim 1 from 80 to 40 wt. % of an organic diluent.

6. A lubricating oil composition comprising a major amount of an oil of lubricating viscosity and a minor amount of the composition of claim 1.

* * * * *